United States Patent [19]
Demange

[11] Patent Number: 5,355,522
[45] Date of Patent: Oct. 11, 1994

[54] FREQUENCY SELECTION METHOD AND APPARATUS

[75] Inventor: Mark G. Demange, Schaumburg, Ill.

[73] Assignee: Motorola, Inc., Schaumburg, Ill.

[21] Appl. No.: 904,621

[22] Filed: Jun. 26, 1992

[51] Int. Cl.⁵ .......................................... H04B 17/00
[52] U.S. Cl. ..................................... 455/62; 455/56.1; 455/66
[58] Field of Search ................. 455/62, 63, 34.2, 56.1, 455/66, 67.1, 161.3, 161.1; 370/95.1, 95.3

[56] References Cited

U.S. PATENT DOCUMENTS

| | | | |
|---|---|---|---|
| 4,197,500 | 4/1980 | Klein | 455/62 |
| 4,736,453 | 4/1988 | Schloemer | 455/62 X |
| 4,965,865 | 10/1990 | Schloemer | 455/34.1 X |
| 5,046,066 | 9/1991 | Messenger | 455/66 X |
| 5,095,535 | 3/1992 | Freeburg | 455/277.1 X |
| 5,212,803 | 5/1993 | Uddenfeldt et al. | 455/62 X |
| 5,276,908 | 1/1994 | Koohgoli | 455/34.1 |

Primary Examiner—Reinhard J. Eisenzopf
Assistant Examiner—Philip J. Sobutka
Attorney, Agent, or Firm—Val Jean F. Hillman

[57] ABSTRACT

Within a radio frequency (RF) communications system (200) having a plurality of transceivers (10) operating at various frequencies (F1-FN) within a predetermined range, a method (700-722) and apparatus (600) for selecting an operating frequency from within said range for use by communications equipment (10) commencing operation within said system (200). Said method and apparatus comprising apparatus and method steps whereby the communications equipment (10) scans (at 706), from its intended location of operation, a set of frequencies (F1-FN) within said range, stores (at 708-714) a table of information (800) corresponding to signals (300) sensed during said scanning, evaluates (at 716) the stored information to determine (at 718) a number of interference sources associated with each scanned frequency, and selects (at 722) that frequency from within the range having the least number of associated interference sources.

23 Claims, 4 Drawing Sheets

| PACKET NUMBER | CRC P/F | RX ANTENNA NUMBER | CM ID | TX ANTENNA NUMBER | INTERFERENCE COUNTER |
|---|---|---|---|---|---|
| 2 | P | A1 | 1 | A2 | 1 |
| 3 | P | A1 | 5 | A2 | 2 |
| 4 | P | A1 | 1 | A2 | 2 |
| 5 | P | A1 | 1 | A3 | 3 |
| 8 | P | A4 | 5 | A2 | 4 |
| 1 | P | A1 | X | X | 4 |
| 6 | P | A3 | X | X | 5 |
| 7 | P | A4 | X | X | 5 |

FREQUENCY SELECTION METHOD AND APPARATUS

FIELD OF THE INVENTION

This invention relates generally to cellular radio communications systems and more particularly to a method for dynamically selecting one of a plurality of operating frequency for transmitting message signals by communications equipment commencing operation within such a system.

BACKGROUND OF THE INVENTION

In a radio communications system covering a large geographic area (cell) not adequately serviced by a single radio frequency transmitter, it is known to distribute among a plurality of radio frequency transmitters a fixed number of sets of channels arranged in a predetermined pattern. This pattern is reused throughout the geographic area in such a way as to assure that radio frequency transmitters utilizing the same channel sets, i.e., co-channels, are spaced by a sufficient distance to assure that co-channel interference is held to acceptably low levels.

In the course of system growth, as it becomes necessary to add additional radio frequency transmitters to support additional cells, it was heretofore deemed necessary to assign channels to the new cells in accordance with the the existing reuse pattern. Thus, at each system growth step, as new cells are added, certain expensive, extensive, and inconvenient operations are typically required. Such operations include, but are by no means limited to, cell site reevaluations, radio relocations and radio retuning. As will be appreciated, such operations are typically based upon some form of theoretical modelling as opposed to the evaluation of purely empirical data. Thus, the cost and inaccuracy of these labor intensive efforts does not always promote the most efficient use of the available RF spectrum.

It would be extremely advantageous therefore, to provide a method whereby a newly deployed radio frequency transmitter can determine its own operating frequency based upon its own evaluation of the existing RF environment.

SUMMARY OF THE INVENTION

Briefly described, the present invention is a method and apparatus for selecting a frequency of operation for a new control module seeking to commence operation within an existing radio frequency (RF) communications system. In this effort, the new control module attempts to avoid RF interference to and from a plurality of control modules operating at various frequencies within a predetermined range, by scanning, at its intended location of operation, a set of frequencies within said range, storing a table of values corresponding to signals sensed during said scanning, evaluating the stored values to determine a number of interference sources associated with each scanned frequency, and selecting that frequency from within the set having the least number of associated interference sources for use by the new control module.

DETAILED DESCRIPTION OF THE PREFERRED EMBODIMENT

Figure 1:
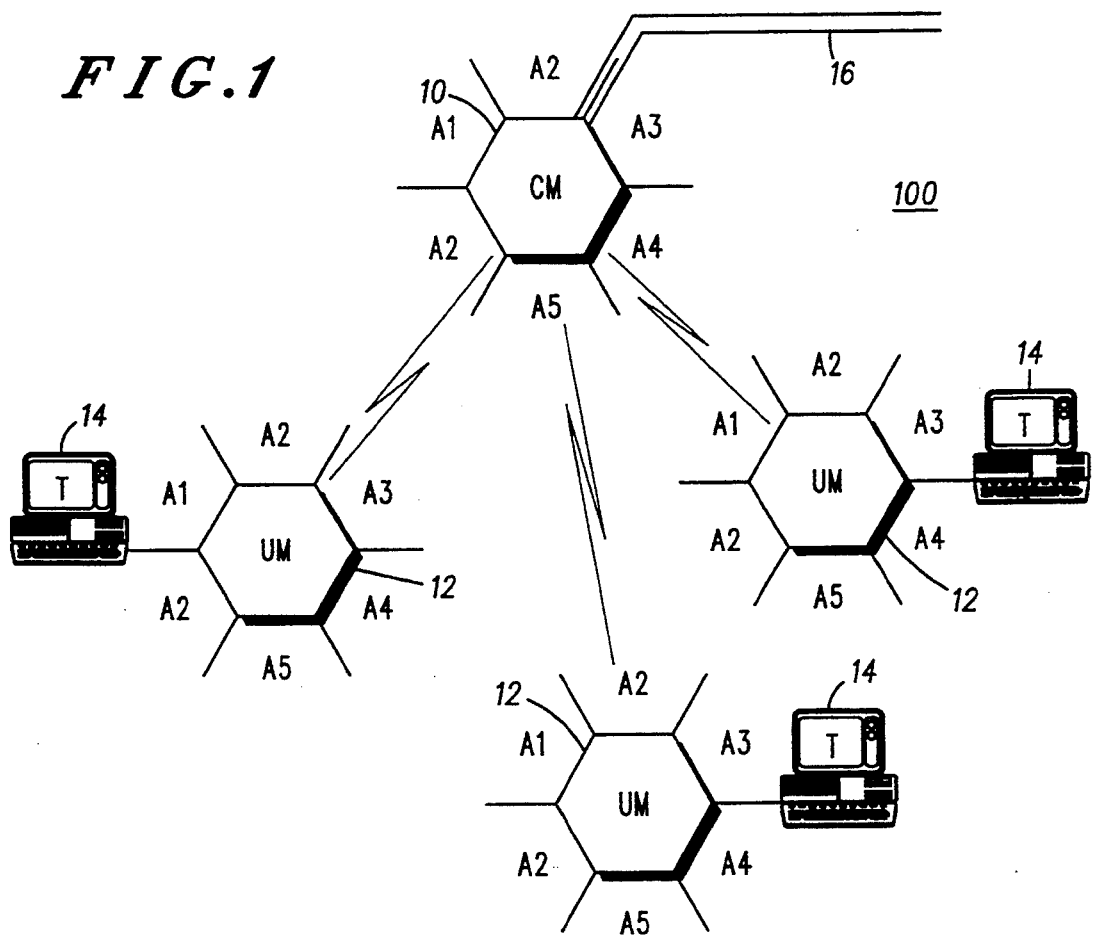
FIG. 1 illustrates a wireless Local Area Network (LAN) suited for incorporating the present invention.

The present invention has application to cellular radio frequency (RF) communication systems. For instance, businesses which have adopted wireless Local Area Networks (LAN) transmit data using RF communications. FIG. 1 illustrates a wireless LAN 100 in which a control module (CM) 10 utilizes RF signalling to communicate with user modules (UMs) 12 that are each coupled to one or more user devices 14. User devices 14 may comprise either a terminal, personal computer, telephone, or other information input/output device. In the illustrative system, the CM 10 is also coupled by a data channel 16 to a data network. The CM 10 controls communications within the illustrated network and passes information from the data network channel 16 to user devices 14 via an associated UM 12. The CM 10 also controls local communications by receiving information from one UM 12 and relaying the information to a different UM 12. The information is conveyed in the form of transmission packets. The network to which the CM 10 is connected may consist of an Ethernet network, a Token Ring network, or any of the other of the well known voice and data networks.

In the illustrative embodiment, the CM and UMs communicate with each other using six directional antennas A1–A6 oriented to cover 360° in the horizontal plane. Depending on the positioning of the UMs relative to the CM, different antennas will likely provide the best communications path. For additional information on the wireless LAN 100 of FIG. 1, the interested reader is directed to U.S. Pat. Ser. No. 07/719,212, filed Jun. 21, 1991, entitled "VOICE AND DATA PACKET COMMUNICATION METHOD AND APPARATUS", and assigned to the assignee of the present application.

Figure 2:
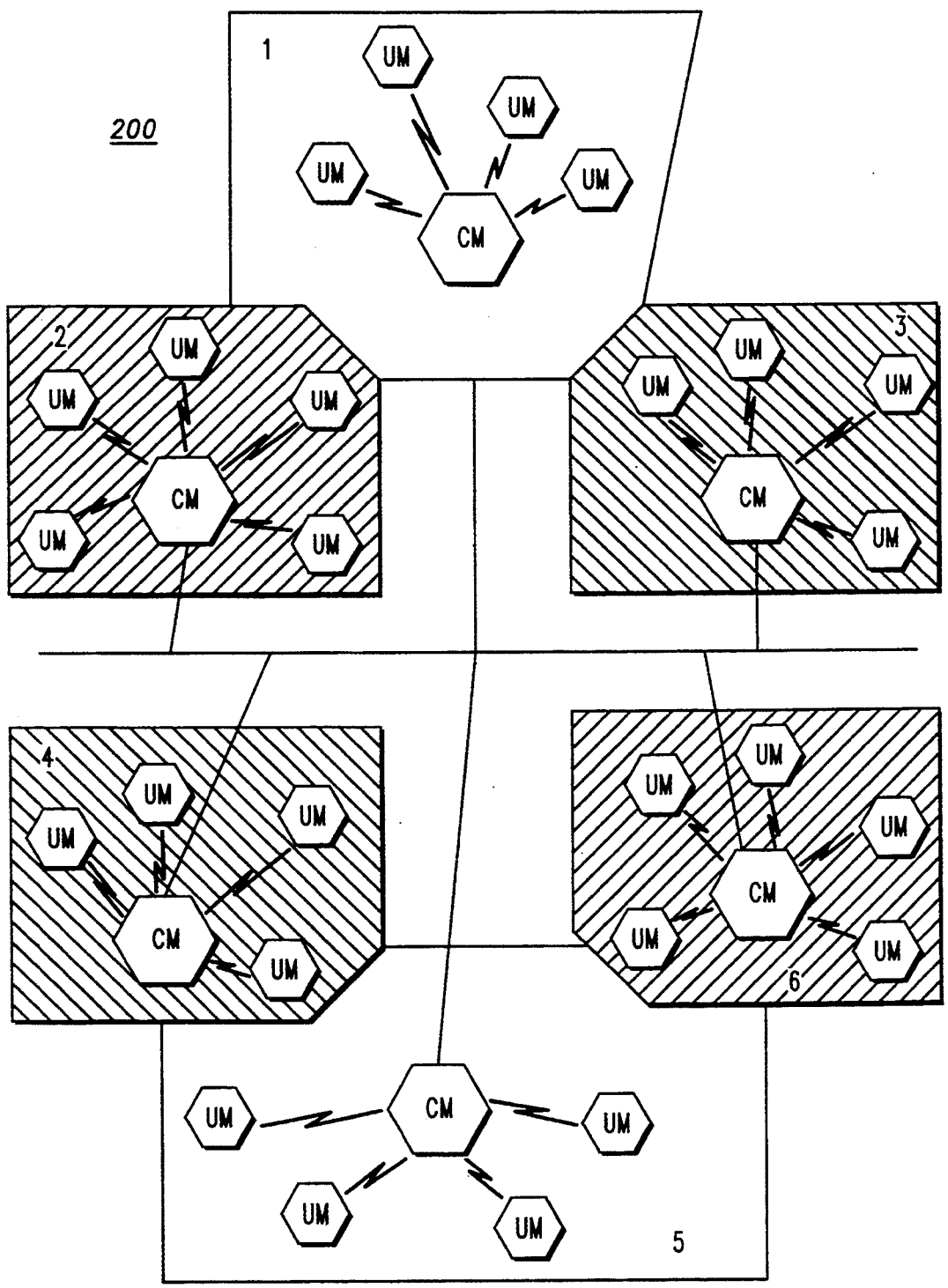
FIG. 2 illustrates the wireless LAN of FIG. 1 depicted in a microcell installation.

FIG. 2 illustrates a microcell installation 200 of several wireless LANs 100 in accordance with the present invention. This system comprises a plurality of distinct and separate cells, identified 1–6. Each cell has a single CM which communicates with the UMs within that cell over a single operating frequency.

Assuming the typical in-building/office environment, frequency reuse investigation and analysis concludes that the most likely source of interference between the cochannel cells (1,5; 2,6; and 3,4) is CM to CM interference. This is due in part to the deployment of CMs in areas within the office space which tend to maximize its RF coverage. It will be appreciated therefore, that in the course of system growth, as new CMs are deployed in order to support additional cells, cochannel interference represents a major concern. It should also be noted that in the installation of FIG. 2, where CMs communicate via six directional antennas A1–A6, respectively, there are as many as thirty six separate and distinct possible interference paths between any two cochannel CMs.

Figure 3:
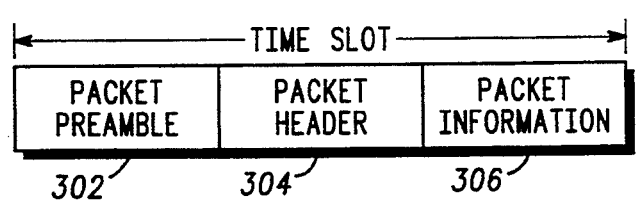
FIG. 3 depicts the structure of a burst transmission for communication within the wireless LAN of FIGS. 1 and 2.

As previously mentioned, the information transmitted between CMs and UMs is conveyed in the form of transmission packets. FIG. 3 depicts a typical structure for a transmission packet 300 for use within the wireless LAN communication system of the present invention. This type of packet is periodically transmitted by each CM on each of its six antennas for communication and-/or CM to UM cell synchronization purposes. The format 300 illustrates the transmission of packet preamble information 302, a packet header 304, and packet information field 306. The packet preamble 302 is provided for radio synchronization purposes, the packet header 304 will be explained in more detail below, and the packet information field 306 represents among other things, the information to be communicated between users.

Figure 4:
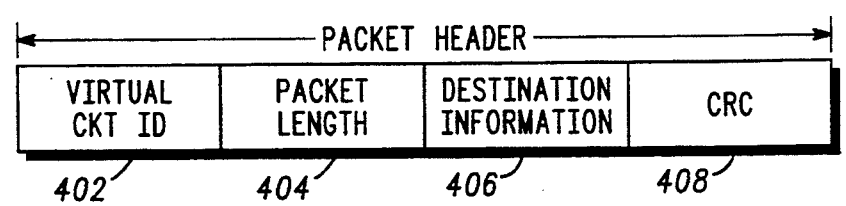
FIG. 4 illustrates the information contained in the packet header of FIG. 3.

FIG. 4 illustrates the information contained in the packet header 304 of FIG. 3. The packet header contains a virtual circuit identification 402, packet length information 404, ultimate destination information 406, and cyclic redundancy calculation (CRC) validation information 408. The virtual circuit identification (VCID) 402 contains information that specifies to a receiving device (UM), a pointer that holds control information used to store the packet information field in the appropriate memory location. For the purposes of the present invention, the VCID field 402 identifies the antenna number (A1–A6) of the CM (source) which transmitted the packet in question. The packet length field 404 provides information concerning the length of the transmitted packet. The destination information 406 typically contains the address of a user device 14. The CRC field 408 contains data associated with a CRC data accuracy calculation.

Figure 5:
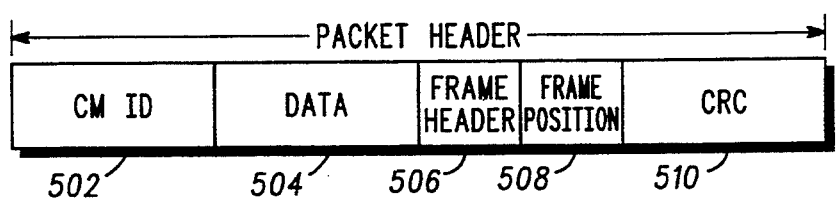
FIG. 5 illustrates the information contained in the packet information field of FIG. 3.

FIG. 5 illustrates the information contained in the packet information field 306 of FIG. 3. The packet information field 306 contains a CMID field 502 which identifies the source CM, a data field 504 containing the information typically passed between users, and a frame number 506, frame position 508 and a CRC field 510 used for error checking.

Figures 6, 8:
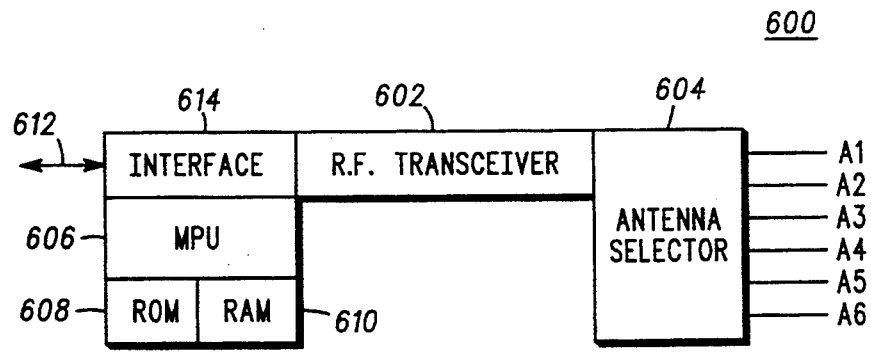
FIG. 6, illustrates a block diagram of a structure common to both the CMs and the UMs of FIGS. 1 and 2.
FIG. 8 depicts a possible reordered table structure in accordance with the present invention.

FIG. 6 illustrates a block diagram of a structure common to both the CM and the UMs. An RF transceiver 602 utilizes digital data to modulate an RF carrier to transmit the desired data and its receiver converts received RF signals into corresponding digital data. Any one of the antenna elements A1–A6 can be coupled to the transceiver 602 by antenna selector 604 which may comprise a conventional mechanical or electrical switching control. A microprocessor 606 operates under the control of an operating system contained in read only memory 608 and utilizes random access memory 610. The microprocessor 606 controls inbound and outbound data carried by path 612, the transceiver 602, and the antenna selector 604. An interface 614 may consist of line drivers and input/output buffers and registers as is conventional in microprocessor systems. The path 612 corresponds to communication channel 16 of FIG. 1 where the embodiment is utilized as a CM and corresponds to the connection to a terminal 14 of FIG. 1 where the embodiment is utilized as a UM. The microprocessor operation relating to frequency selection is explained below.

Figure 7:
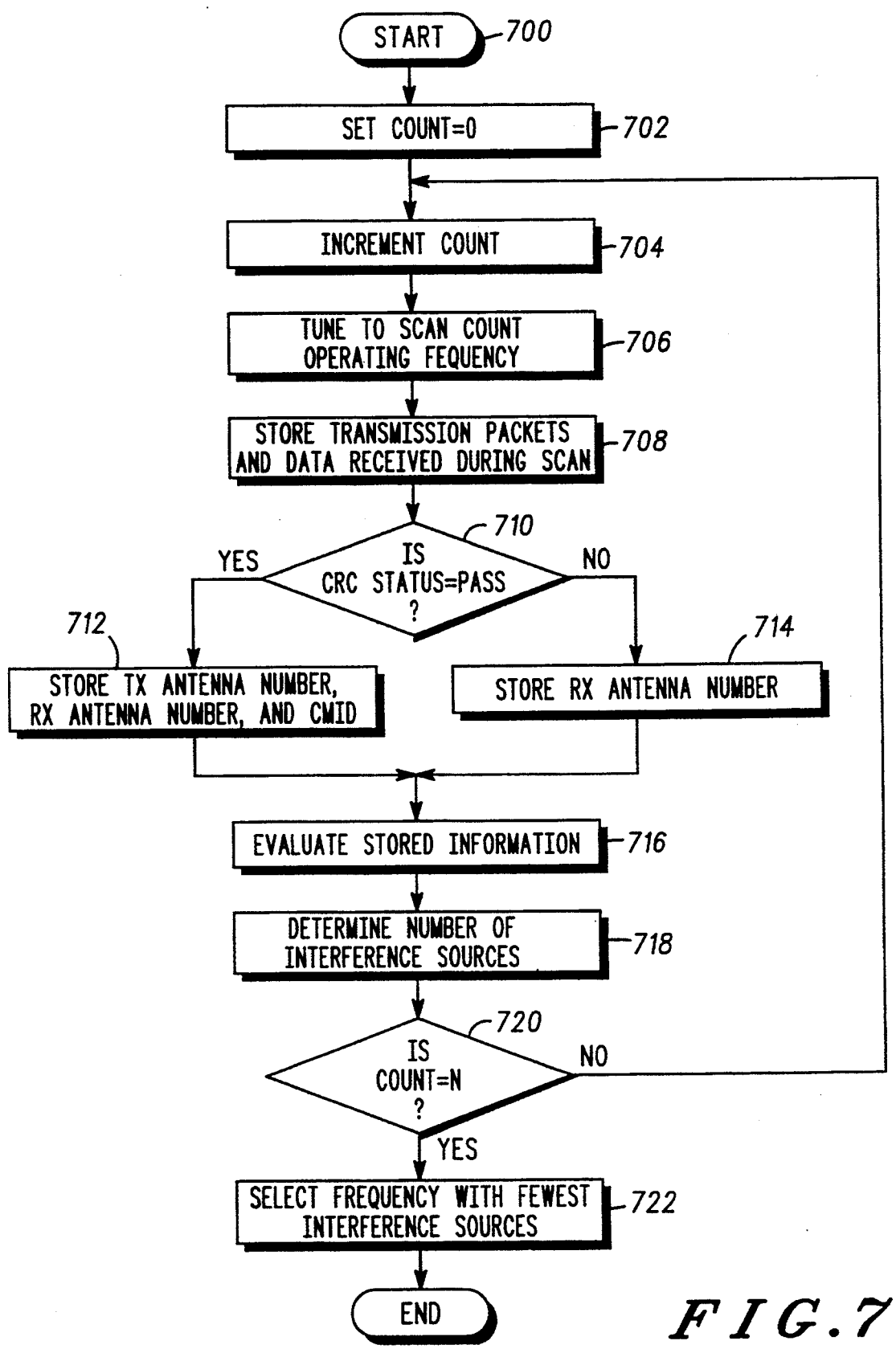
FIG. 7 depicts a flow chart diagram of the steps performed by a CM prior to commencing operation in the installation depicted in FIG. 2.

FIG. 7, depicts a flow chart diagram of the steps performed by an initializing CM prior to commencing operation in the installation 200 of FIG. 2. From start block 700, flow proceeds to block 702 where a counter is set to 0. From block 702, flow proceeds to block 704 where the count is incremented. From block 704, flow proceeds to block 706 where an initializing CM tunes to and scans the operating frequency associated with the count to determine its suitability.

As will be appreciated, said frequencies, F1-FN, are a finite set of values, typically stored in the memory of each CM. In accordance with the preferred embodiment, each CM has an identical list of 10 operating frequencies available for use by each. In order to provide the CMs with power surge protection, the selected frequency values are stored in the non-volatile ROM memory. This will permit a power down without the loss of available operating frequency values.

Proceeding to block 708, the initializing CM will store at least some of the information received during the scan of an operating frequency. In accordance with the present invention, the initializing CM will store received packet transmissions 300, received signal strength indications (RSSI), signal quality information and the antenna number A1–A6 associated with the reception of each transmission. The received signal strength indication (RSSI), signal quality information and received antenna number are appended onto the end of each received burst transmission, prior to said storage. Armed with this data, the initializing CM will select an operating frequency, F1-FN, based at least partly upon the existing RF environment, and thereby attempt to avoid or at least minimize the effects of cochannel interference.

In this effort, a check is performed on each received transmission, at block 710, to determine whether it has passed the initializing CM's CRC validation. If so, flow proceeds to block 712 where the packets VCID field 402 of FIG. 4, CMID field 502 of FIG. 5 and received antenna number are stored in memory. If CRC validation is failed at block 710, flow proceeds to block 714 where only the receive antenna number for the received transmission is stored.

Proceeding to block 716 an evaluation is performed on the information stored at blocks 712 and 714. In accordance with one embodiment, the evaluation at block 716 comprises first reordering the stored packet information. Reordering requires that each memory entry for received packets received during the scan of a particular frequency and having a CRC pass status, must precede those memory entries for packets received during the same scan and having a CRC fail status, regardless of the order in which they were originally received.

Referring to FIG. 8, a possible reordered memory table structure 800 in accordance with the present invention is illustrated. Of note, each successive frequency scan will result in the generation of a new memory table 800 to be stored in the RAM memory 610 of FIG. 6. Each table 800 has multiple entries, each entry comprising at least a packet number, CRC status, Received antenna number, CMID, source antenna number, and Interference Count field. In accordance with the illustrated example, the second packet received during this scan was transmitted by CM 1 on antenna A2 and was received by the initiating CM on its antenna A1. The reception of this packet indicates the presence of an interference path, thus the interference count is incremented to a 1.

The third packet received during this same scan was transmitted by CM 5 on its antenna A2 and was received by the initiating CM on its antenna A1. Since this packet was received from a different source CM, the interference count is incremented to 2, in order to identify an additional interference path.

The fourth packet received was transmitted by CM 1 on antenna A2 and was received by the initiating CM on antenna A1. Since this information is a duplication of a previously received packet, the CM recognizes this as a previously identified interference path. As a result, the interference count is not incremented.

The fifth packet received during this scan was transmitted by CM 1 on antenna A3 and was received by the initiating CM on antenna A1. While this packet was transmitted from a previously identified source CM, it was nonetheless transmitted from a different antenna element, A3. As a result, the interference count is incremented to 3 in order to identify an additional interference path.

The eighth packet received was transmitted by CM 5 on its antenna A2 and was received by the initiating CM on its antenna A4. Despite the fact that CM 5 has been identified as an interference source, the eighth packet was received on a different initializing CM antenna. Consequently, the interference count is incremented to 4 in order to identify this additional interference path.

The first packet received during this scan was received on antenna element A1 and failed the CRC validation. As a result, its source is unknown. Moreover, since it was received on an antenna element previously identified as experiencing interference, there is no way to assure that it represents an independent source of interference. Consequently, the interference count is not incremented.

The sixth packet received came in on antenna element A3 and likewise failed CRC validation. While its source is unknown, it was received on a CM antenna element, A3, which has not previously been identified with an interference path. As a result, the interference count is incremented to 5, in order to reflect this newly identified interferer.

Finally, the seventh packet came in on antenna element A4 and likewise failed CRC validation. While its source is unknown, it was nonetheless received by antenna element A4 which has previously been identified as an antenna element subject to interference. As a result, the interference count is not incremented.

This type of reordering and analysis is repeated for each received transmission during a scan. The importance of the reordering step is that without reordering, packet number 1 and packet number 7, if analyzed in the order received, would have caused the CM to erroneously identify them as interference paths.

In accordance with yet another embodiment, the evaluation performed at block 716 comprises analyzing the stored packet information having a CRC pass status, before analyzing the stored packet information having a CRC fail status, regardless of the order in which they were originally received. In this effort, the MPU 606 of FIG. 6 will selectively address and analyze those table 800 memory entries having a CRC pass status prior to addressing and analyzing those table 800 memory entries having a CRC fail status.

Returning to FIG. 7, flow proceeds to block 718, where the number of interference sources associated with this scan is determined. Thereafter, flow proceeds to block 720 where a check is performed to determine whether all operating frequencies have been scanned. If not, flow branches back to block 704 where the count is incremented and the previously mentioned steps are repeated at each successive operating frequency until all scanning is complete.

In addition to scanning the available operating frequencies, the initializing CM may also scan the adjacent frequencies around each of the available operating frequencies in order to determine the presence of adjacent channel interference. In accordance with a preferred embodiment, an initializing CM scans those frequencies within a ±15 MHz band of each operating frequencies.

Upon completion, flow proceeds to block 722 where the number of interference paths associated with each frequency scan are compared to determine and select that operating frequency with the fewest interference sources. As will be appreciated, the initializing CM will select that frequency as its frequency of operation and commence transmitting packetized information to and from the UMs within the cell serviced by that CM, thereby avoiding or at least minimizing the effects of cochannel and adjacent channel interference. The selected operating frequency is stored in the non-volatile ROM memory 608 of FIG. 6, thereby obviating the need to repeat the frequency selection search process after a power loss.

What is claimed is:

1. In a radio frequency (RF) communications system having a plurality of control modules having transceivers operating at various frequencies within a predetermined range, a method for selecting an operating frequency from within said range for use by a new control module seeking to commence operation within said system, said method comprising the steps of:
   scanning, by the new control module, at its intended location of operation, a set of frequencies within said range;
   storing a table of information corresponding to signals sensed during said scanning;
   evaluating the stored information to determine a number of interference sources associated with each scanned frequency; and
   selecting that frequency from within the set having the least number of associated interference sources for use by the new control module.

2. The method of claim 1 wherein the step of scanning further comprises the steps of:
   tuning the new control module to at least some of the frequencies within said range; and
   receiving transmissions on each said frequency.

3. The method of claim 1 wherein the step of storing further comprises the step of storing at least some of the information within a received transmission packet.

4. The method according to claim 3 wherein the step of storing at least some of the information within a received transmission includes storing a cyclic redundancy calculation (CRC) pass/fail status for each received transmission.

5. The method according to claim 4 further comprising the steps of:
   storing a source control module transceiver ID,
   storing a source control module antenna number, and storing the new control module receiver antenna number, upon receipt of a packet having a CRC pass status.

6. The method according to claim 4 further comprising the step of storing the new control module receiver antenna number upon receipt of a transmission having a CRC fail status.

7. The method of claim 1 wherein the step of evaluating further comprises the steps of:
reordering the stored information in memory, such that each transmission having a CRC pass status precedes those transmissions having a CRC fail status regardless of the order received; and
identifying a number of interference sources for each frequency scanned based at least partly upon the reordered information.

8. The method of claim 1 wherein the step of evaluating further comprises the steps of:
analyzing the stored information associated with transmissions having a CRC pass status before analyzing the information associated with transmissions having a CRC fail status, regardless of the order received; and
identifying a number of interference sources for each frequency scanned based at least partly upon the analyzed information.

9. A radio frequency (RF) communications system for minimizing the RF interference from a plurality of control modules having transceivers operating at various frequencies within a predetermined range to a new control module seeking to commence operation within said system, the new control module having a transmitter and a receiver for operating in said range of frequencies, the system comprising:
said receiver of the new control module including means for scanning a predetermined set of frequencies within said range, at the receiver's intended location of operation;
memory, coupled to the receiver, for storing a table of values corresponding to signals sensed during said scanning;
a processor, coupled to said memory, for evaluating the stored values to determine a number of interference sources associated with each frequency scanned; and
said processor further for selecting that frequency from within the set having the least number of associated interference sources for use by the new control module.

10. The system of claim 9 wherein the receiver further comprises:
means for tuning the new control module to at least some of the frequencies within said range; and
means for receiving transmission from said control module plurality on each said frequency.

11. The system of claim 9 wherein the memory stores at least a cyclic redundancy calculation (CRC) pass/fail status for each received transmission.

12. The system of claim 9 wherein the memory stores at least some of the information within a received transmission packet.

13. The system of claim 12 wherein the memory further stores a control module ID and a control module antenna number for the control module from among the control module plurality transmitting a received packet and a receiver antenna number for the receiver of the new control module, upon receipt of a transmission packet having a CRC pass status.

14. The system of claim 11 wherein the memory further stores a receiver antenna number for said receiver of the new control module, upon receipt of a transmission having a CRC fail status.

15. The system of claim 9 wherein said means for evaluating further comprises:
means for reordering the stored information in memory, such that each transmission having a CRC pass status precedes those transmissions having a CRC fail status, regardless of the order received; and
means, coupled to the reordering means, for identifying a number of interference sources for each frequency scanned based at least partly upon the reordered information.

16. The system of claim 9 wherein the means for evaluating further comprises:
means for analyzing the stored information associated with transmissions having a CRC pass status before analyzing the information associated with transmission having a CRC fail status, and
means, coupled to the analyzing means, for identifying a number of interference sources for each frequency scanned based at least partly upon the analyzed information.

17. In a radio frequency (RF) communications system having a plurality of control modules operating at various frequencies within a predetermined range, a method for selecting an operating frequency from within said range for use by a new control module having a transmitter and a receiver and seeking to commence operation within said system, said method comprising the steps of:
scanning, by the new control module, at its intended location of operation, a set of frequencies within said range;
receiving control module transmissions on at least some of the scanned frequencies;
storing at least some of the information associated with each received transmission;
evaluating the stored information to determine a number of interference sources associated with each scanned frequency; and
selecting a frequency from within the range having the least number of associated interference sources for use by the new control module.

18. The method of claim 17 wherein the step of storing at least some of the received information includes storing a cyclic redundancy calculation (CRC) pass/fail status for each received transmission.

19. The method according to claim 18 further comprising the steps of:
storing a transmitting control module's ID;
storing a transmitting control module's antenna number; and
storing the new control module receiver antenna number, upon receipt of a transmission having a CRC pass status.

20. The method according to claim 18 further comprising the step of storing the new control module receiver antenna number upon receipt of a transmission having a CRC fail status.

21. The method of claim 17 wherein the step of evaluating the stored packet information further comprises the steps of:
analyzing the stored information associated with transmissions having a CRC pass status before analyzing the information associated with transmission having a CRC fail status, regardless of the order received; and identifying a number of interference sources for each frequency scanned based at least partly upon the analyzed information.

22. The method of claim 21 wherein the step of analyzing further comprises the steps of recognizing and ignoring duplicate packet information.

23. A wireless radio frequency control module having a transmitter and receiver comprising:

means for inhibiting the transmitter until a predetermined frequency of operation is selected;

means for scanning a predetermined set of possible operating frequencies with the receiver at its intended location of operation;

the receiver, coupled to said scanning means, for receiving transmissions on st least some of the scanned frequencies;

means, coupled to the receiver, for storing information corresponding to each received transmission;

means, coupled to the storing means, for evaluating the stored information to determine a number of interference sources associated with each scanned frequency;

means, coupled to the evaluating means, for selecting that frequency from within the scanned range having the least number of associated interference sources for use by the new control module; and means for unlocking the new control module transmitter and permitting it to begin transmissions at the selected frequency.

* * * * *